(12) United States Patent  (10) Patent No.: US 8,511,596 B2
Anderson  (45) Date of Patent: Aug. 20, 2013

(54) DRIP TAPE MANAGEMENT

(75) Inventor: Noel Wayne Anderson, Fargo, ND (US)

(73) Assignee: Deere & Company, Moline, IL (US)

( * ) Notice: Subject to any disclaimer, the term of this patent is extended or adjusted under 35 U.S.C. 154(b) by 250 days.

(21) Appl. No.: 12/904,487

(22) Filed: Oct. 14, 2010

(65) Prior Publication Data

US 2012/0091236 A1   Apr. 19, 2012

(51) Int. Cl.
*B02C 19/00* (2006.01)
(52) U.S. Cl.
USPC ....... 241/101.742; 241/101.762; 241/101.763
(58) Field of Classification Search
USPC .................. 241/101.763, 101.762, 101.742
See application file for complete search history.

(56) References Cited

U.S. PATENT DOCUMENTS

| 1,761,281 | A |   | 6/1930  | Taub |
| 2,484,195 | A |   | 10/1949 | Gilead |
| 2,716,317 | A | * | 8/1955  | McClellan ................ 56/16.4 B |
| 2,749,180 | A |   | 6/1956  | Andrews |
| 2,771,320 | A |   | 11/1956 | Korwin |
| 3,361,369 | A |   | 1/1968  | Chapin |
| 3,387,307 | A |   | 6/1968  | Biatz |
| 3,426,544 | A |   | 2/1969  | Curtis |
| 3,540,223 | A |   | 11/1970 | Ebbe |
| 2,549,223 | A |   | 12/1970 | Ebbe |
| 3,545,692 | A | * | 12/1970 | Burkett ......................... 241/281 |
| 3,613,309 | A |   | 10/1971 | Coburn |
| 3,613,357 | A |   | 10/1971 | Coburn |
| 3,669,357 | A |   | 6/1972  | Overbey |
| 3,672,571 | A |   | 6/1972  | Goodricke |
| 3,727,345 | A |   | 4/1973  | Smith |
| 3,736,755 | A |   | 6/1973  | Hammond et al. |
| 3,739,522 | A |   | 6/1973  | Greenbaum |
| 3,774,850 | A |   | 11/1973 | Zeman |
| 3,797,754 | A |   | 3/1974  | Spencer |
| RE28,095  | E |   | 7/1974  | Chapin |
| 3,826,436 | A | * | 7/1974  | Cetrulo .................... 241/186.35 |
| 3,860,179 | A |   | 1/1975  | Costa |
| 3,366,833 | A |   | 2/1975  | Shibata et al. |
| 3,870,236 | A |   | 3/1975  | Sahagun-Barragan |
| 3,872,621 | A |   | 3/1975  | Greenbaum |
| 3,874,598 | A |   | 4/1975  | Havens |
| 3,887,138 | A |   | 6/1975  | Gilead |
| 3,887,139 | A |   | 6/1975  | Pearce |
| 3,896,999 | A |   | 7/1975  | Barragan |
| 3,899,135 | A |   | 8/1975  | O'Brian |
| 3,903,929 | A |   | 9/1975  | Mock |
| 3,911,187 | A |   | 10/1975 | Raley |
| 3,939,875 | A |   | 2/1976  | Osborn et al. |
| 3,946,762 | A |   | 3/1976  | Green |

(Continued)

FOREIGN PATENT DOCUMENTS

| DE | 2726358 | 12/1977 |
| DE | 2542623 | 3/1978 |

(Continued)

*Primary Examiner* — Faye Francis
(74) *Attorney, Agent, or Firm* — Yee & Associates, P.C.

(57) ABSTRACT

The illustrative embodiments of the present invention provide a method and apparatus for managing drip tape. A vehicle is configured to move across a field. A drip tape collection system is associated with the vehicle configured to raise a portion of the drip tape from the ground in a field. A chopper is configured to separate the portion of the drip tape received from the drip tape collection system into a plurality of pieces and enable the plurality of pieces to decompose.

16 Claims, 7 Drawing Sheets

(56) References Cited

U.S. PATENT DOCUMENTS

| | | | |
|---|---|---|---|
| 3,961,112 A | | 6/1976 | Genevitz et al. |
| 3,988,396 A | | 10/1976 | Stannard |
| 3,998,392 A | | 12/1976 | St. Clair |
| 4,009,832 A | | 3/1977 | Tiedt |
| 4,022,384 A | | 5/1977 | Hoyle et al. |
| 4,033,518 A | * | 7/1977 | Fleming et al. ............... 241/47 |
| 4,047,995 A | | 9/1977 | Leal-Diaz |
| 4,053,109 A | | 10/1977 | Gilead |
| 4,061,272 A | | 12/1977 | Winston |
| 4,123,006 A | | 10/1978 | Yukishita |
| 4,126,998 A | | 11/1978 | Gilead |
| 4,139,159 A | | 2/1979 | Inoue et al. |
| 4,166,580 A | | 9/1979 | Meckel |
| 4,170,044 A | | 10/1979 | Steimle |
| 4,173,309 A | | 11/1979 | Drori |
| 4,175,882 A | | 11/1979 | Gilead |
| 4,177,946 A | | 12/1979 | Sahagun-Barragan |
| 4,210,287 A | | 7/1980 | Mehoudar |
| 4,211,743 A | | 7/1980 | Nauta |
| 4,247,051 A | | 1/1981 | Allport |
| 4,285,472 A | | 8/1981 | Okada et al. |
| 4,354,639 A | | 10/1982 | Delmer |
| 4,359,442 A | | 11/1982 | Cleminson |
| 4,385,727 A | | 5/1983 | Spencer |
| 4,407,114 A | * | 10/1983 | Zweegers .................... 56/344 |
| 4,413,787 A | | 11/1983 | Gilead et al. |
| 4,460,129 A | | 7/1984 | Olson |
| 4,473,191 A | | 9/1984 | Chapin |
| 4,474,330 A | | 10/1984 | Langa |
| 4,496,105 A | * | 1/1985 | Fleming et al. ............... 241/32 |
| 4,534,515 A | | 8/1985 | Chapin |
| 4,541,569 A | | 9/1985 | Langa |
| 4,548,360 A | | 10/1985 | Delmer et al. |
| 4,626,130 A | | 12/1986 | Chapin |
| 4,634,484 A | | 1/1987 | Wagner |
| 4,655,397 A | | 4/1987 | Gorney |
| 4,722,769 A | | 2/1988 | Chan et al. |
| 4,726,520 A | | 2/1988 | Brown et al. |
| 4,763,842 A | | 8/1988 | Dunn |
| 4,807,668 A | | 2/1989 | Roberts |
| 4,874,132 A | | 10/1989 | Gilead |
| 4,984,739 A | | 1/1991 | Allport |
| 5,049,721 A | | 9/1991 | Parnas et al. |
| 5,111,995 A | | 5/1992 | Dumitrascu et al. |
| 5,118,042 A | | 6/1992 | Delmer |
| 5,123,984 A | | 6/1992 | Allport et al. |
| 5,133,707 A | | 7/1992 | Rogers et al. |
| 5,246,171 A | | 9/1993 | Roberts |
| 5,266,257 A | | 11/1993 | Kildune |
| 5,282,578 A | | 2/1994 | De Frank |
| 5,287,397 A | | 2/1994 | Dumsha |
| 5,318,657 A | | 6/1994 | Roberts |
| 5,346,929 A | | 9/1994 | Guttag |
| 5,354,003 A | * | 10/1994 | Stokes .................... 241/101.763 |
| 5,366,023 A | | 11/1994 | Souza |
| 5,375,770 A | | 12/1994 | Roberts |
| 5,387,307 A | | 2/1995 | Roberts |
| 5,391,423 A | | 2/1995 | Wnuk et al. |
| 5,498,207 A | * | 3/1996 | Cappon et al. ............... 460/119 |
| 5,545,547 A | | 8/1996 | Kolattukudy et al. |
| 5,597,728 A | | 1/1997 | Wyatt et al. |
| 5,620,143 A | | 4/1997 | Delmer et al. |
| 5,695,127 A | | 12/1997 | Delmer et al. |
| 5,785,785 A | | 7/1998 | Delmer et al. |
| 5,941,316 A | * | 8/1999 | Mansur ....................... 171/58 |
| 6,160,199 A | | 12/2000 | Noda |
| 6,255,451 B1 | | 7/2001 | Koch et al. |
| 6,277,228 B1 | | 8/2001 | Fabrikant et al. |
| 6,350,410 B1 | | 2/2002 | Iverson et al. |
| 6,460,786 B1 | | 10/2002 | Roberts |
| 6,626,608 B2 | * | 9/2003 | Olynyk ....................... 404/91 |
| 6,840,006 B2 | | 1/2005 | Dussaud et al. |
| 6,903,053 B2 | | 6/2005 | Noda et al. |
| 6,948,663 B1 | | 9/2005 | Graham, Jr. et al. |
| 7,098,292 B2 | | 8/2006 | Zhao et al. |
| 7,647,724 B2 | | 1/2010 | Caron et al. |
| 2003/0183708 A1 | * | 10/2003 | Di Anna ................ 241/101.763 |
| 2003/0226589 A1 | | 12/2003 | Agosta |
| 2003/0232952 A1 | | 12/2003 | Rosen |
| 2006/0079662 A1 | | 4/2006 | Fukui et al. |
| 2006/0177930 A1 | | 8/2006 | Bramucci et al. |
| 2007/0144065 A1 | | 6/2007 | Lowe |
| 2008/0041978 A1 | | 2/2008 | Keren |
| 2008/0191464 A1 | | 8/2008 | Yankovitz et al. |

FOREIGN PATENT DOCUMENTS

| | | |
|---|---|---|
| DE | 2835117 | 2/1979 |
| EP | 69487 | 1/1983 |
| EP | 0129151 | 12/1984 |
| EP | 0196763 | 10/1986 |
| GS | 1286538 | 10/1969 |
| IL | 43263 | 1/1976 |
| WO | 8500003 | 1/1985 |
| WO | 9221228 | 12/1992 |

* cited by examiner

DRIP TAPE MANAGEMENT

FIELD OF THE INVENTION

The present invention relates generally to methods and apparatuses for managing an irrigation system, and more particularly, to methods and apparatuses for managing drip tape. Still more specifically, the present disclosure relates to a method and apparatus for collecting and separating drip tape.

BACKGROUND OF THE INVENTION

Agricultural irrigation systems are used to apply water to agricultural crops. Different types of irrigation systems are presently used. One type of irrigation system is a flood irrigation system in which trenches formed in the water are moved to soil at an agricultural site using gravitational force. For example, water can be diverted from a river by a gated trench to an agricultural site at a lower elevation.

Another type of irrigation system is a center pivot irrigation system. This type of system moves water using an electric powered water pump. Different pressures may be used with this type of irrigation system. The water typically is pumped from a well, river or irrigation pond. Intermittently spaced towers carrying a supply pipe are driven by electric motors or water driven turbines.

Yet another type of irrigation system is a traveler system. A traveler system is a flexible hose coupled with a standpipe in a field supplied by a water pump.

Another more recent type of irrigation is drip irrigation. With this type of irrigation, water flows an under pressure through a water delivery mechanism such as drip tape. Drip tape allows water to flow out a tube under pressure. For example, drip tape may be a tube through which water flowing through the tube delivers water outside of the tube though openings in the tube. In another example, drip tape may be a tube through which water slowing through the tube delivers water outside of the tube through a porous material of the tube. The water is used to water plants that are near the tube. In some examples, drip tape has a substantially flat shape with the water exits in under pressure from the tube. A supply header receives water from a water pump and the drip tapes are coupled with the supply header. The configuration of the drip tapes may form a network having a shape that corresponds to the shape of the field.

A drip irrigation system as described above has the advantages of directly delivering water and nutrients to an area in close proximity to the plants which maximizes plant growth and production, while limiting problems associated with other types of irrigation systems, such as erosion, disease, weed growth, soil saturation, energy costs and water conservation.

SUMMARY

An embodiment of the present invention provides a method for managing drip tape. The method comprises raising a portion of the drip tape from a ground in a field. The method also comprises separating the portion of the drip tape raised from the ground into a plurality of pieces. The method also comprises enabling the plurality of pieces to decompose.

Another embodiment of the present invention provides an apparatus. The apparatus comprises a vehicle configured to move across a field. The apparatus also comprises a drip tape collection system associated with the vehicle configured to raise a portion of the drip tape from a ground in a field. The apparatus also comprises a chopper configured to separate the portion of the drip tape received from the drip tape collection system into a plurality of pieces and enable the plurality of pieces to decompose.

The features, functions, and advantages can be achieved independently in various embodiments of the present invention or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and advantages thereof, will best be understood by reference to the following detailed description of an illustrative embodiment of the present invention when read in conjunction with the accompanying drawings, wherein:

DESCRIPTION OF THE PREFERRED EMBODIMENT

Figure 1:
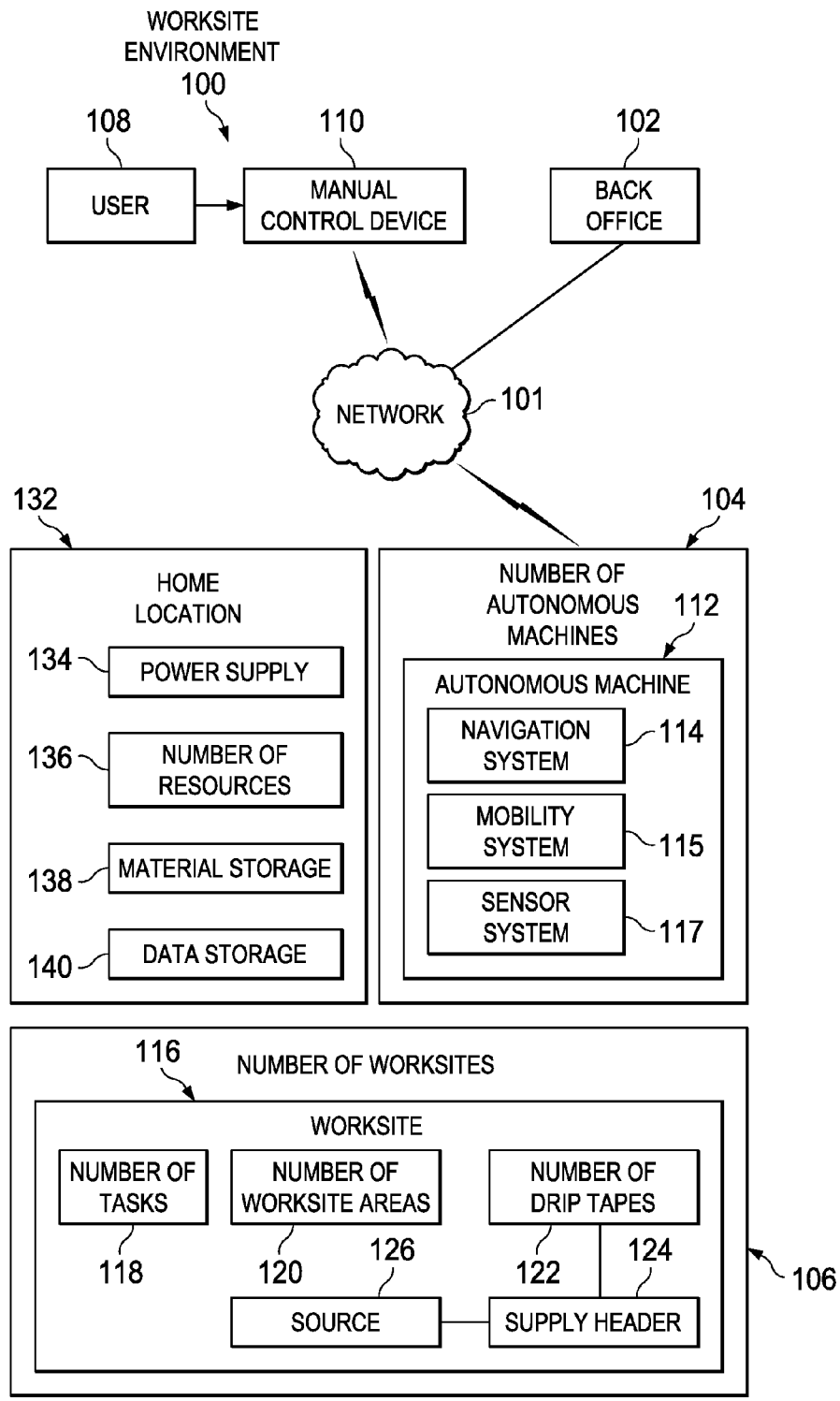
FIG. 1 is a block diagram of a worksite environment depicted in which an illustrative embodiment may be implemented.

With reference to the figures, and in particular, with reference to FIG. 1, a block diagram of a worksite environment is depicted in which an illustrative embodiment may be implemented. Worksite environment 100 may be any type of worksite environment in which an autonomous machine can operate. In an illustrative example, worksite environment 100 may be a worksite, area, field, yard, corn field, grove of trees, golf course, outdoor environment, and/or any other suitable worksite environment or combination of worksite environments.

Worksite environment 100 includes network 101 in one illustrative embodiment. In the depicted example, back office 102 may be a single computer or a distributed computing cloud. Back office 102 supports the physical databases and/or connections to external databases which may be used in the different illustrative embodiments. Back office 102 may supply databases to different machines, as well as provide online access to information from databases. Back office 102 may also provide path plans for vehicles and/or machines, such as number of autonomous machines 104, for example. Worksite environment 100 may include number of autonomous machines 104, number of worksites 106, user 108, and manual control device 110. As used herein, a number of items means one or more items. For example, number of worksites 106 is one or more worksites.

An autonomous machine may be any type of machine that moves and performs tasks. Number of autonomous machines 104 may be any type of autonomous machine including, without limitation, a mobile robotic machine, a service robot, a field robot, a robotic mower, a robotic snow removal machine, a robotic leaf removal machine, a robotic lawn watering machine, a robotic vacuum, a robotic floor cleaner, a material gathering machine, a material application machine, a sensing machine, and/or any other autonomous machine. As used herein, autonomous machines include semi-autonomous machines which have an operator on-board or nearby to perform one or more functions. These functions may include, for example without limitation, one or more of guidance, safeguarding, diagnosis, task monitoring, task control, or data recording.

Autonomous machine 112 is an illustrative example of one implementation of an autonomous machine from number of autonomous machines 104. Autonomous machine 112 includes navigation system 114. Navigation system 114 provides a base system for controlling the mobility, positioning, and navigation for autonomous machine 112. Base system capabilities may include base behaviors such as, for example, without limitation, base mobility functions for effectuating random area coverage of a worksite and/or a number of worksite areas, base obstacle avoidance functions for contact switch obstacle avoidance, base dead reckoning for positioning functions, and/or any other combination of basic functionality for autonomous machine 112.

Autonomous machine 112 includes mobility system 115. Mobility system 115 provides mobility for an autonomous machine 112. Mobility system 115 may take various forms. Mobility system 115 may include, for example, without limitation, a propulsion system, steering system, braking system, and mobility components as shown in more illustrative detail in FIG. 3 and in the description of FIG. 3 below.

Autonomous machine 112 includes sensor system 117. Sensor system 117 may include a number of sensor systems for collecting and transmitting sensor data to a processor unit. For example, sensor system 117 may include, without limitation, a dead reckoning system, a global satellite navigation receiver, and/or some other suitable type of sensor system, as shown in more illustrative detail in FIG. 4. Sensor data is information collected by sensor system 117.

Number of worksites 106 may be any area within worksite environment 100 in which number of autonomous machines 104 can operate. Each worksite in number of worksites 106 may be associated with a number of tasks. Worksite 116 is an illustrative example of one worksite in number of worksites 106. For example, in an illustrative embodiment, worksite 116 may be a yard and garden surrounding a residence of user 108. Worksite 116 includes number of tasks 118. In an illustrative example, number of tasks 118 may include mowing the yard of the residence of user 108. Number of tasks 118 may be managing drip tape in the garden. Number of tasks 118 may be collecting drip tape, separating the drip tape, returning the drip tape to a field or garden, or any combination thereof.

Number of tasks 118 may also be any type of area coverage task including, without limitation, a service task, a field task, mowing, snow removal, leaf removal, lawn watering, vacuuming, cleaning, material gathering, material application, sensing, data collection, and/or any other type of task. Autonomous machine 112 may operate to perform number of tasks 118 within worksite 116. As used herein, number refers to one or more items. In one illustrative example, number of worksites 106 may include, without limitation, a primary yard and a secondary yard. The primary yard may be worksite 116, associated with number of tasks 118. The secondary yard may be associated with another set of tasks, for example. In one illustrative example, the secondary yard may be in the same geographical location as the primary yard, but with different sub-regions, or worksite areas, defined for a different set of tasks than number of tasks 118.

Each worksite in number of worksites 106 may include a number drip tapes. Worksite 116 includes number of worksite areas 120 and number of drip tapes 122. In an illustrative example, number of worksite areas 120 may be a number of regions, or sub-areas, within worksite 116, such as, for example, without limitation, a first region, a second region, a third region, and so on.

Number of drip tapes 122 may be any type of irrigation equipment used to irrigate worksite 116. A drip tape may be a tube used to distribute fluids to worksite 116. Number of drip tapes 122 may be supplied by a pipeline such as supply header 124. Supply header 124 may receive the fluids from source 126, such as a water source. The fluids may be transmitted through supply header 124 then through number of drip tapes 122 by a pump. Autonomous machine 112 may be configured to collect number of drip tapes 122 from worksite 116. Autonomous machine 112 may also be configured to separate number of drip tapes 122 into a plurality of pieces and return the plurality of pieces to worksite 116.

User 108 may be, without limitation, a human operator, a robotic operator, or some other external system. Manual control device 110 may be any type of manual controller, which allows user 108 to override autonomous behaviors and control number of autonomous machines 104. In an illustrative example, user 108 may use manual control device 110 to control movement of number of autonomous machines 104 from home location 132 to worksite 116 in order to perform number of tasks 118.

Home location 132 may be a docking station or storage station for number of autonomous machines 104. Home location 132 may include power supply 134, number of resources 136, material storage 138, data storage 140, any combination of the foregoing, and/or any other suitable component. Power supply 134 may provide power to number of autonomous machines 104 when number of autonomous machines 104 is at home location 132. In an illustrative example, power supply 134 may recharge a power store or power supply of number of autonomous machines 104. Power supply 134 may include, without limitation, a battery, mobile battery re-charger, ultra-capacitor, fuel cell, gas powered generator, photo cells, and/or any other suitable power source.

Number of resources 136 may be any type of resource or material capable of being distributed and/or applied across number of worksites 106 by number of autonomous machines 104. In one illustrative embodiment, number of resources 136 may include, for example, without limitation, water, fertilizer, plant nutrients, pest control chemicals, plant seed, and/or any other suitable resources. Number of resources 136 may be related to the number of tasks associated with a worksite, such as number of tasks 118 for worksite 116, for example.

Material storage 138 may be any type of storage for a material and/or element collected by number of autonomous machines 104 throughout number of worksites 106. In an illustrative embodiment, material storage 138 may be used to store number of drip tapes 122. In a different illustrative embodiment, material storage 138 may be used to collect lawn clippings, plant clippings, ground cover, soil, debris, and/or any other suitable material. Material storage 138 may be related to the number of tasks associated with a worksite, such as number of tasks 118 for worksite 116, for example.

Data storage 140 may be used to collect and store data collected by number of autonomous machines 104 during operation in worksite environment 100. In an illustrative example, number of autonomous machines 104 may collect sensor data during operation within number of worksites 106. Number of autonomous machines 104 may have limited data storage capacity, and may transfer stored data to data storage 140 when number of autonomous machines is at home location 132 in order to free up space for additional collection of data on number of autonomous machines 104, for example. Data storage 140 may be used, for example to store data relating to an order that number of drip tapes 122 was collected.

The illustration of worksite environment 100 in FIG. 1 is not meant to imply physical or architectural limitations to the manner in which different illustrative embodiments may be implemented. Other components in addition to, and/or in place of, the ones illustrated may be used. Some components may be unnecessary in some illustrative embodiments. Also, the blocks are presented to illustrate some functional components. One or more of these blocks may be combined and/or divided into different blocks when implemented in different illustrative embodiments.

For example, in one illustrative embodiment, autonomous machine 112 may have an attachment to collect number of drip tapes 122. In another illustrative embodiment, number of drip tapes 122 may include different areas of drip tapes which are not associated with one another.

The different illustrative embodiments recognize that with drip tape irrigation, drip tapes are placed within the ground at a level that may interfere with subsequent field operations. Drip tape may be removed at different points in time during an agricultural season. Drip tape may also be removed if the drip tape is not working properly. It is possible to use special equipment to remove the drip tape from the field, but this adds more cost and time to the field operations. It is also possible that the drip tape which is removed from the ground may be reused. When the drip tape can no longer be used, it must be hauled to, and disposed of, in a landfill or taken to a specially equipped recycling center. Hauling the drip tape to a landfill or recycling center also adds cost.

The illustrative embodiments of the present invention provide a method and apparatus for managing drip tape. A vehicle is configured to move across a field. A drip tape collection system is associated with the vehicle configured to raise a portion of the drip tape from a ground in a field. A chopper is configured to separate the portion of the drip tape received from the drip tape collection system into a plurality of pieces and enable the plurality of pieces to decompose. In different illustrative embodiments, the plurality of pieces could be collected and moved to a second location where decomposition occurs.

Figure 2:
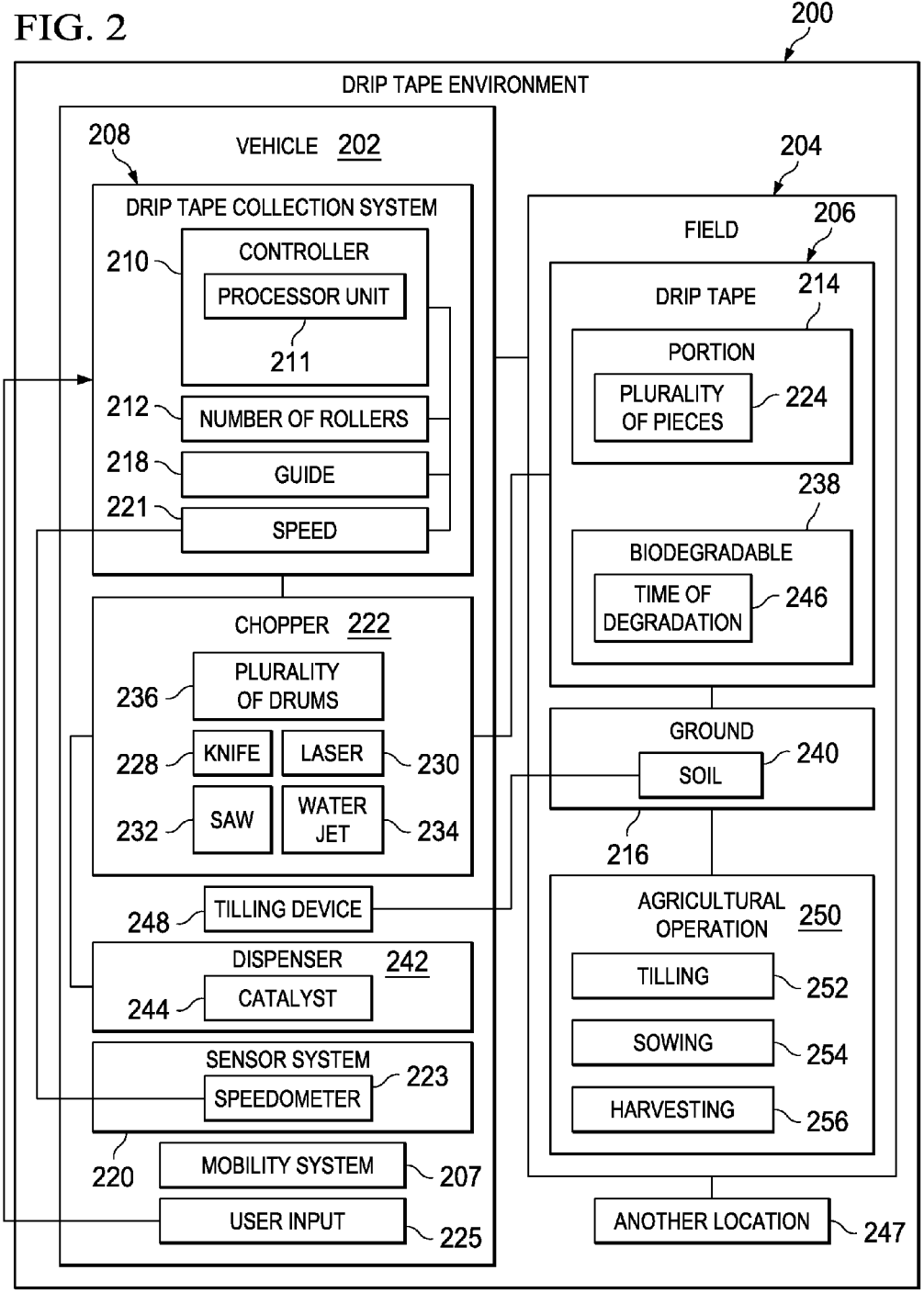
FIG. 2 is a block diagram of a drip tape environment depicted in accordance with an illustrative embodiment.

With reference now to FIG. 2, a block diagram of a drip tape environment is depicted in accordance with an illustrative embodiment. Drip tape environment 200 is an example of one implementation of worksite environment 100 in FIG. 1.

Drip tape environment 200 provides for vehicle 202 on field 204 to collect and manage drip tape 206. Vehicle 202 may be one example of one implementation of autonomous machine 112 in FIG. 1. Without limitation, vehicle 202 may be a tractor, a utility vehicle, a skid steer vehicle, a chemical sprayer, a cart pulled by an animal, or any other suitable vehicle. Vehicle 202 may move across field 204 using mobility system 207. Mobility system 207 may be one example of one implementation of mobility system 115 in FIG. 1. Vehicle 202 may collect drip tape 206 using drip tape collection system 208. Drip tape 206 may be identified as different objects such as number of drip tapes 122 in FIG. 1. Collection of drip tape 206 may be one example of one implementation of number of tasks 118 in FIG. 1. As used herein, drip tape may take different forms. For example, drip tape may be irrigation drip tape, seed tape, mulch, edging, or any other persistent strip of material used in an agricultural, horticultural, silvicultural, or turf setting. The settings may include, without limitation, yards, lawns, golf courses, fields, forests, orchards, and vineyards.

Drip tape collection system 208 includes controller 210. Controller 210 may include processor unit 211. Processor unit 211 may be a number of processors, a multi-processor core, or some other type of processor, depending on the particular implementation. A number, as used herein with reference to an item, means one or more items. Controller 210 is configured to control number of rollers 212 raise portion 214 of drip tape 206 from ground 216 of field 204. Controller 210 is also configured to control guide 218 to receive portion 214 of drip tape 206 from ground 216 and guide portion 214 onto number of rollers 212. Once drip tape 206 is collected, drip tape 206 may be stored using material storage 138 in FIG. 1.

Number of rollers 212 may be any type of rollers configured to receive drip tape 206. Number of rollers may be designed to receive a shape for drip tape 206. Guide 218 may be designed for the shape and size of drip tape 206. Guide 218 may also be designed to pick up drip tape 206. Controller 210 may use sensor system 220 to identify speed 221 of vehicle 202. Controller 210 may then rotate number of rollers 212. The rotation of the rollers 212 raises drip tape 206 when drip tape 206 is engaged, or in the rollers 212. The collection of drip tape 206 using rollers 212 may be collected at a rate substantially similar to speed 221 of vehicle 202. Sensor system 220 may identify speed 221 of vehicle 202 using speedometer 223. By collecting drip tape 206 at a rate similar to speed 221 of vehicle 202, synchronization between vehicle 202 and collecting drip tape 206 is being performed. In different illustrative embodiments, synchronization of vehicle 202, number of rollers 212, guide 218, or chopper 222 may be achieved mechanically using devices such as, without limitation, gears, pulleys, belts, and shafts.

Controller 210 may use sensor system 220 to identify a location and/or orientation of drip tape 206. For example, sensor system 220 may be able to identify a latitude and longitude of drip tape 206. In another illustrative embodiment, sensor system 220 may be able to identify different features associated with drip tape 206. Sensor system 220 may include, for example, an infrared emitter, a radio frequency transmitter, a visible light emitter, a point on a signal emitting wire, a fixed object with a radio-frequency identification (RFID) tag or bar code, a fixed object with a known number of attributes such as color, diameter, shape, and pattern. Controller 210 may then move guide 218 in different directions based on data from sensor system 220. Controller 210 may move guide 218 to receive or grab drip tape 206. Controller 210 may receive a signal from user input 225 to initiate rotation of number of rollers 212 when speed 221 is zero to enable initial feeding of drip tape 206 into number of rollers 212. User input 225 may be from a user pressing a button on vehicle 202. In different illustrative embodiments, user input 225 may be from a remote location, such as, for example, a remote computer, a tablet pc, or a cell phone. Drip tape 206 may be attached to number of rollers 212 by a user manually attaching drip tape 206. In different illustrative embodiments, drip tape 206 is attached by being guided into number of rollers 206 by guide 218 after being identified by sensor system 220.

Vehicle 202 also includes chopper 222. Chopper 222 is configured to separate portion 214 of drip tape 206 received from drip tape collection system 208 into plurality of pieces 224. Once drip tape 206 is separated into plurality of pieces 224, chopper 222 may then return plurality of pieces 224 to ground 216. In different illustrative embodiments, drip tape 206 may be only collected and stored for another use. When collected and stored, drip tape 206 may not be separated into plurality of pieces 224.

Chopper 222 may be configured to separate portion 214 of drip tape 206 in a number of different ways. For example, chopper 222 may be configured to cut drip tape 206 into plurality of pieces 224 using different cutting devices. Chopper 222 may use, for example, knife 228, laser 230, saw 232, water jet 234, or any other device capable of cutting drip tape 206. In different illustrative embodiments, chopper 222 may separate drip tape 206 using compression. Chopper 222 may be configured to use plurality of drums 236 to breakdown drip tape 206 into plurality of pieces 224.

Drip tape 206 may be biodegradable 238. Biodegradable 238 allows drip tape 206 to break down into the environment and soil 240 of ground 216. In different illustrative embodiments, vehicle 202 may use dispenser 242 to dispense catalyst 244 onto plurality of pieces 224 before plurality of pieces 224 is returned to ground 216. Catalyst 244 shortens time of degradation 246 of drip tape 206.

Another location 247 is a different location from where drip tape 206 was collected. Another location 247 may be part of field 204 or outside of field 204. Plurality of pieces 224 may be transferred to another location 247 instead of returned to ground 216 in different illustrative embodiments.

Vehicle 202 also includes tilling device 248 to perform agricultural operation 250 of tilling 252. Tilling device 248 may be, for example, a plough, harrow, dibble, hoe, shovel, rotary tiller, subsoiler, roller, or a combination thereof. In different illustrative embodiments, vehicle 202 may be equipped with other equipment to perform other operations such as sowing 254, harvesting 256, and other operations.

The illustration of drip tape environment 200 in FIG. 2 is not meant to imply physical or architectural limitations to the manner in which different illustrative embodiments may be implemented. Other components in addition to, and/or in place of, the ones illustrated may be used. Some components may be unnecessary in some illustrative embodiments.

Also, the blocks are presented to illustrate some functional components. One or more of these blocks may be combined and/or divided into different blocks when implemented in different illustrative embodiments. For example, chopper 222 may be located as an accessory of vehicle 202 and not part of vehicle 202. Additionally, dispenser 242 may be located on another piece of equipment and apply catalyst 244 after chopper 222 has separated drip tape 206.

Figure 3:
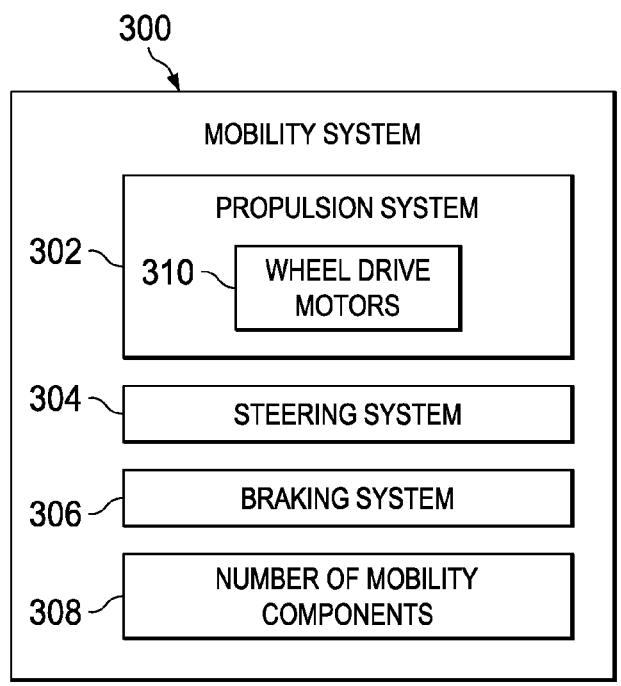
FIG. 3 is a block diagram of a mobility system depicted in accordance with an illustrative embodiment.

With reference now to FIG. 3, a block diagram of a mobility system is depicted in accordance with an illustrative embodiment. Mobility system 300 is an example of one implementation of mobility system 115 in FIG. 1. Mobility system 300 is also an example of one implementation of mobility system 207 in FIG. 2.

Mobility system 300 provides mobility for autonomous machines associated with a navigation system, such as navigation system 114 in FIG. 1. Mobility system 300 may take various forms. Mobility system 300 may include, for example, without limitation, propulsion system 302, steering system 304, braking system 306, and number of mobility components 308. In these examples, propulsion system 302 may propel or move an autonomous machine, such as vehicle 202 in FIG. 2, in response to commands from a navigation system, such as navigation system 114 in FIG. 1.

Propulsion system 302 may maintain or increase the speed at which an autonomous machine moves in response to instructions received from a processor unit of a navigation system. Propulsion system 302 may be an electrically controlled propulsion system. Propulsion system 302 may be, for example, without limitation, an internal combustion engine, an internal combustion engine/electric hybrid system, an electric engine, or some other suitable propulsion system. In an illustrative example, propulsion system 302 may include wheel drive motors 310. Wheel drive motors 310 may be an electric motor incorporated into a mobility component, such as a wheel, that drives the mobility component directly. In one illustrative embodiment, steering may be accomplished by differentially controlling wheel drive motors 310.

Steering system 304 controls the direction or steering of an autonomous machine in response to commands received from a processor unit of a navigation system. Steering system 304 may be, for example, without limitation, an electrically controlled hydraulic steering system, an electrically driven rack and pinion steering system, a differential steering system, or some other suitable steering system. In an illustrative example, steering system 304 may include a dedicated wheel configured to control number of mobility components 308.

Braking system 306 may slow down and/or stop an autonomous machine in response to commands received from a processor unit of a navigation system. Braking system 306 may be an electrically controlled braking system. This braking system may be, for example, without limitation, a hydraulic braking system, a friction braking system, a regenerative braking system using wheel drive motors 310, or some other suitable braking system that may be electrically controlled. In one illustrative embodiment, a navigation system may receive commands from an external controller, such as manual control device 110 in FIG. 1, to activate an emergency stop. The navigation system may send commands to mobility system 300 to control braking system 306 to perform the emergency stop, in this illustrative example.

Number of mobility components 308 provides autonomous machines with the capability to move in a number of directions and/or locations in response to instructions received from a processor unit of a navigation system and executed by propulsion system 302, steering system 304, and braking system 306. Number of mobility components 308 may be, for example, without limitation, wheels, tracks, feet, rotors, propellers, wings, and/or other suitable components.

The illustration of mobility system 300 in FIG. 3 is not meant to imply physical or architectural limitations to the manner in which different illustrative embodiments may be implemented. Other components in addition to, and/or in place of, the ones illustrated may be used. Some components may be unnecessary in some illustrative embodiments. Also, the blocks are presented to illustrate some functional components. One or more of these blocks may be combined and/or divided into different blocks when implemented in different illustrative embodiments.

Figure 4:
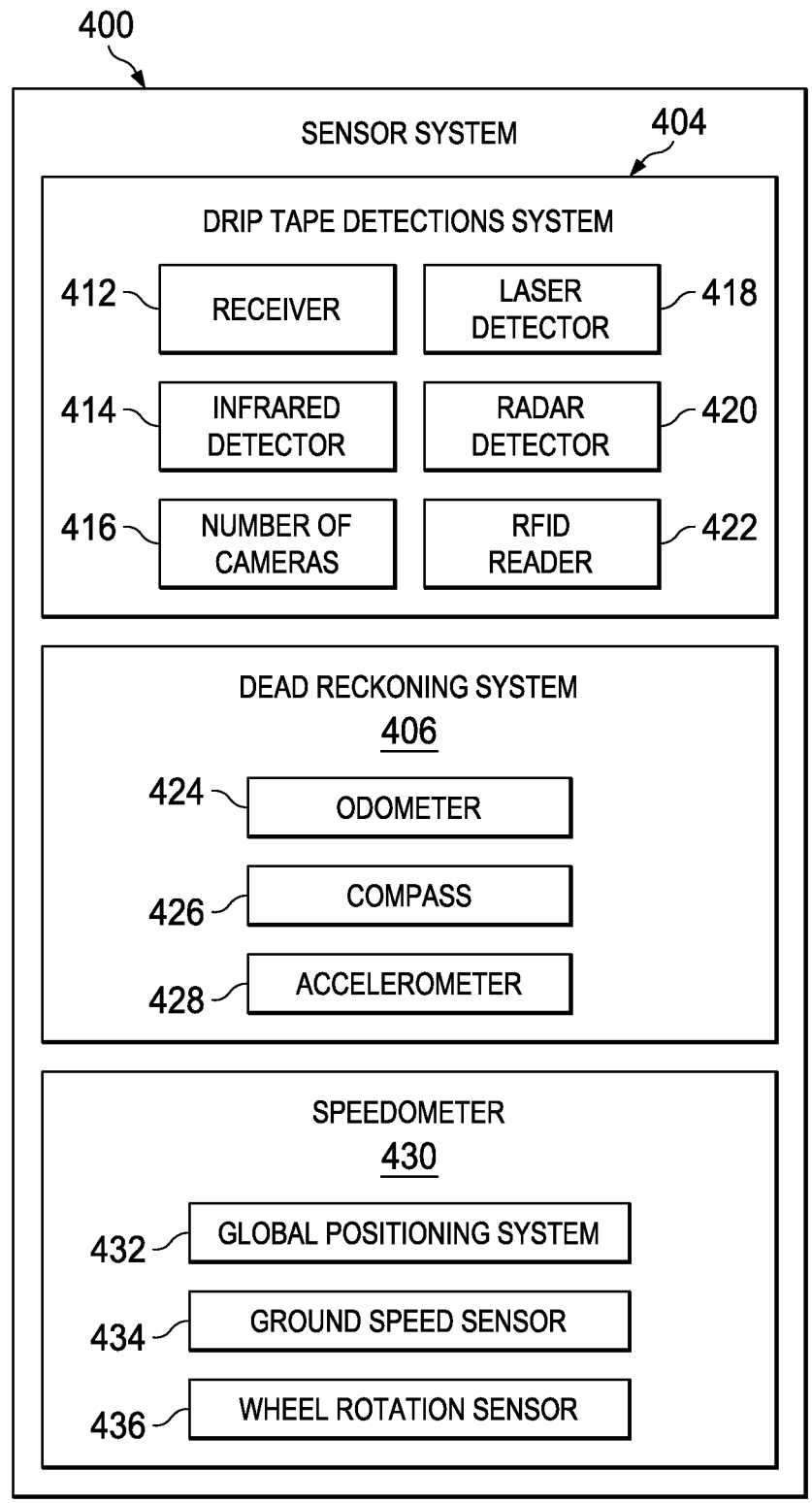
FIG. 4 is a block diagram of a sensor system depicted in accordance with an illustrative embodiment.

With reference now to FIG. 4, a block diagram of a sensor system is depicted in accordance with an illustrative embodiment. Sensor system 400 is an example of one implementation of sensor system 117 in FIG. 1. Sensor system 400 is also an example of one implementation of sensor system 220 in FIG. 2.

Sensor system 400 includes a number of sensor systems for collecting and transmitting sensor data to a processor unit of a navigation system, such as navigation system 114 in FIG. 1. Sensor system 400 may include drip tape detection system 404, dead reckoning system 406, and speedometer 430.

Drip tape detection system 404 detects drip tapes at a worksite, such as worksite 116 in FIG. 1, and sends information about the drip tapes to a processor unit of a navigation system. Drip tape detection system 404 may include, without limitation, receiver 412, infrared detector 414, number of cameras 416, laser detector 418, radar detector 420, radio frequency identification (RFID) reader 422, and/or any other suitable boundary detection component. Receiver 412 may detect electrical signals, which may be emitted by a wire running along a drip tape. The wire running along the drip tape is used to indicate where the drip tape is located. The drip tape may then be collected by a drip tape collection system, such as drip tape collection system 208 in FIG. 2.

Infrared detector 414 detects infrared light, which may be emitted by an infrared light source along drip tapes of a worksite or number of worksite areas. Infrared light may be emitted in a constant beam, a patterned beam, pulsed beam, at pre-determined times, in response to detection of an autonomous vehicle, and/or any other suitable trigger.

Number of cameras 416 may include, for example, without limitation, a color camera, a black and white camera, a digital camera, an infrared camera, and/or any other suitable camera. In one illustrative example, number of cameras 416 may be oriented to capture a view that is down and horizontal relative to the autonomous machine associated with navigation system 300, such as autonomous machine 112 in FIG. 1, for example. In this illustrative example, the orientation of number of cameras 416 may enable autonomous machine behaviors, such as following drip tapes. In an illustrative example where number of cameras 416 includes a color camera, boundary following behaviors may use number of cameras 416 to identify a color boundary, such as green plants contrasted with a drip tape, for example. In another illustrative example, number of cameras 416 may be oriented to capture a view facing perpendicular to the direction of travel of the autonomous machine associated with navigation system 300, such as vehicle 202 in FIG. 2, for example.

In an illustrative example, receiver 412 may detect an electrical signal from a drip tape and send information about that detected signal to a processor unit of a navigation system, such as navigation system 114 in FIG. 1. The navigation system may then send commands to a mobility system, such as mobility system 207 in FIG. 2, to alter the direction or course of an autonomous machine associated with the navigation system, in this illustrative example.

Dead reckoning system 406 estimates the current position of an autonomous machine associated with the navigation system. Dead reckoning system 406 estimates the current position based on a previously determined position and information about the known or estimated speed over elapsed time and course. Dead reckoning system 406 may include, without limitation, odometer 424, compass 426, and accelerometer 428. Odometer 424 is an electronic or mechanical device used to indicate distance traveled by a machine, such as vehicle 202 in FIG. 2. Compass 426 is a device used to determine position or direction relative to the Earth's magnetic poles. Accelerometer 428 measures the change in velocity it experiences in one or more dimensions.

Sensor system 400 may also include speedometer 430. Speedometer 430 is configured to measure the speed of a machine with which speedometer 430 is located. Speedometer may identify the speed of a machine by using global positioning system 432, ground speed sensor 434, and wheel rotation sensor 436.

Global positioning system 432 may identify the location of an autonomous machine with respect to other objects in the environment. Global positioning system 432 may be one example of one implementation of speedometer 223 in FIG. 2. Global positioning system 432 may be any type of radio frequency triangulation scheme based on signal strength and/or time of flight. Examples include, without limitation, the Global Positioning System, Glonass, Galileo, and cell phone tower relative signal strength. Position is typically reported as latitude and longitude with an error that depends on factors, such as ionispheric conditions, satellite constellation, and signal attenuation from vegetation.

Ground speed sensor 434 detects the speed at which the ground is moving relative to the machine. Wheel rotation sensor 436 detects the speed at which the wheel is rotating and is able to identify a speed of the machine based on the speed of the wheel rotation.

The illustration of sensor system 400 in FIG. 4 is not meant to imply physical or architectural limitations to the manner in which different illustrative embodiments may be implemented. Other components in addition to, and/or in place of, the ones illustrated may be used. Some components may be unnecessary in some illustrative embodiments. Also, the blocks are presented to illustrate some functional components. One or more of these blocks may be combined and/or divided into different blocks when implemented in different illustrative embodiments.

Figure 5:
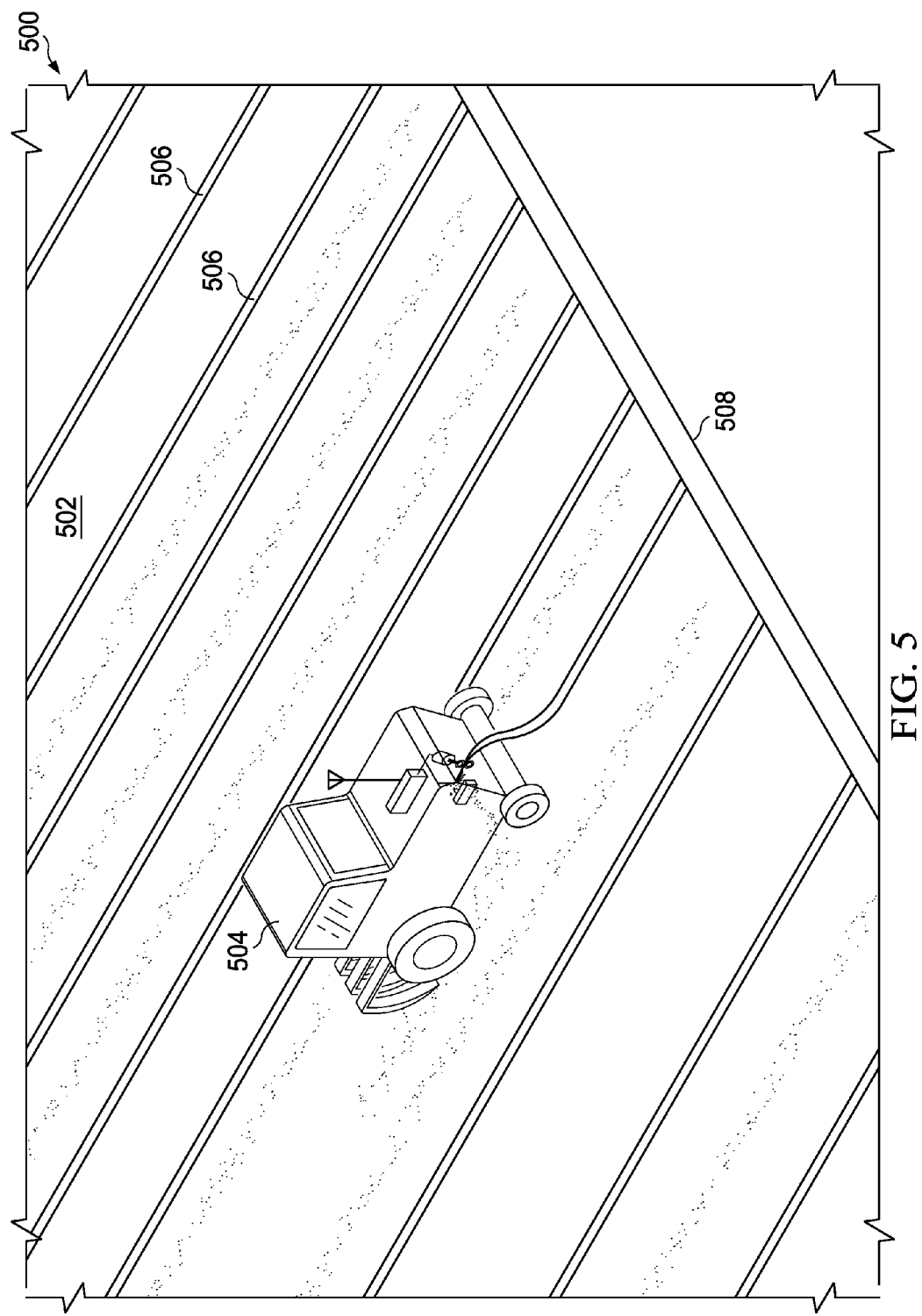
FIG. 5 is a diagram of a drip tape environment depicted in accordance with an illustrative embodiment.

With reference now to FIG. 5, a diagram of a drip tape environment is depicted in accordance with an illustrative embodiment. Drip tape environment 500 is an example of one implementation of drip tape environment 200 in FIG. 2. Drip tape environment 500 includes field 502, vehicle 504, drip tape 506, and supply header 508.

Field 502 may be one example of field 204 in FIG. 2. Field 502 is an area in which vehicle 504 may operate. Vehicle 504 is one example of one implementation of vehicle 202 in FIG. 2. Vehicle 202 is configured to collect and separate drip tape 506. Drip tape 506 receives fluids to irrigate field 502 from supply header 508. Supply header 508 supplies fluids, such as water, to drip tape 506.

Figure 6:
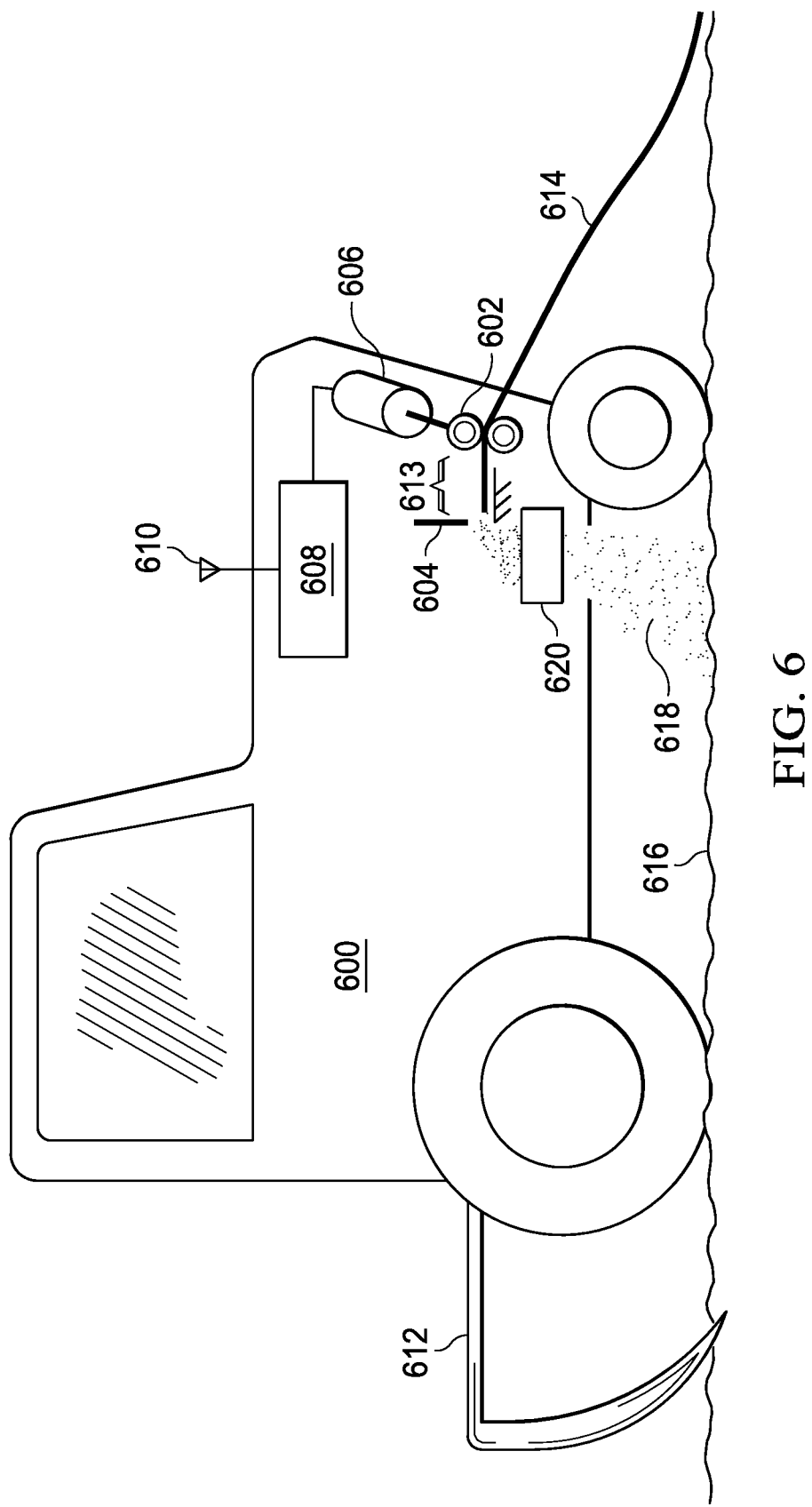
FIG. 6 is a diagram of a vehicle depicted in accordance with an illustrative embodiment.

With reference now to FIG. 6, a diagram of a vehicle is depicted in accordance with an illustrative embodiment. Vehicle 600 is an example of one implementation of vehicle 202 in FIG. 2. Vehicle 600 is also an example of one implementation of vehicle 504 in FIG. 5. Vehicle 600 includes rollers 602, chopper 604, motor 606, controller 608, global positioning system 610, and tilling device 612.

Rollers 602 are configured to collect portion 613 of drip tape 614 from field 616. Portion 613 of drip tape 614 may be the part of drip tape 614 that is currently collected. In different illustrative embodiments, portion 613 may be the part of drip tape 614 located between rollers 602 and field 616. Also, in different illustrative embodiments, portion 613 may be any part, length, or portion of drip tape 614. Portion 613 of drip tape 614 may be portion 214 of drip tape 206 in FIG. 2.

Rollers 602 may be one example of one implementation of number of rollers 212 in FIG. 2. Motor 606 is configured to rotate rollers 602. In different illustrative embodiments, rollers 602 are rotated by the force of drip tape 614 moving through rollers 602.

Vehicle 600 also includes controller 608. Controller 608 is configured to control motor 606 to rotate number of rollers 602 at a speed substantially near the speed of vehicle 600 moving across field 616. Controller 608 controls motor 606 to rotate number of rollers 602 at a rate that allows drip tape 614 to be collected at a speed near the speed of vehicle 600. Controller 608 may receive a speed of vehicle 600 from global positioning system 610.

Chopper 604 is configured to receive drip tape 614 from rollers 602. Chopper 604 may be one example of one implementation of chopper 222 in FIG. 2. Chopper 604 is configured to cut or compress drip tape 614 into plurality of pieces 618.

Vehicle 600 also includes tilling device 612. Tilling device 612 is configured to perform a tilling operation on field 616. Tilling device 612 may be one example of one implementation of tilling device 248 in FIG. 2. In different illustrative embodiments, vehicle 600 may include other equipment to perform other agricultural operations.

In these illustrative embodiments, vehicle 600 may include spreader 620 which distributes plurality of pieces 618 perpendicular to the direction of travel of vehicle 600. In different illustrative embodiments, spreader 620 may distribute plurality of pieces 618 in other directions. Spreader 620 may be a rotating disk, a rotating bar, a reciprocating bar, a variable air stream, or any other suitable distribution means. In different illustrative embodiments, motor 606, rollers 602, chopper 604, and spreader 620 may be configured to enable a vehicle to process a number of drip tapes 614 in parallel to the movement of vehicle 600.

Figure 7:
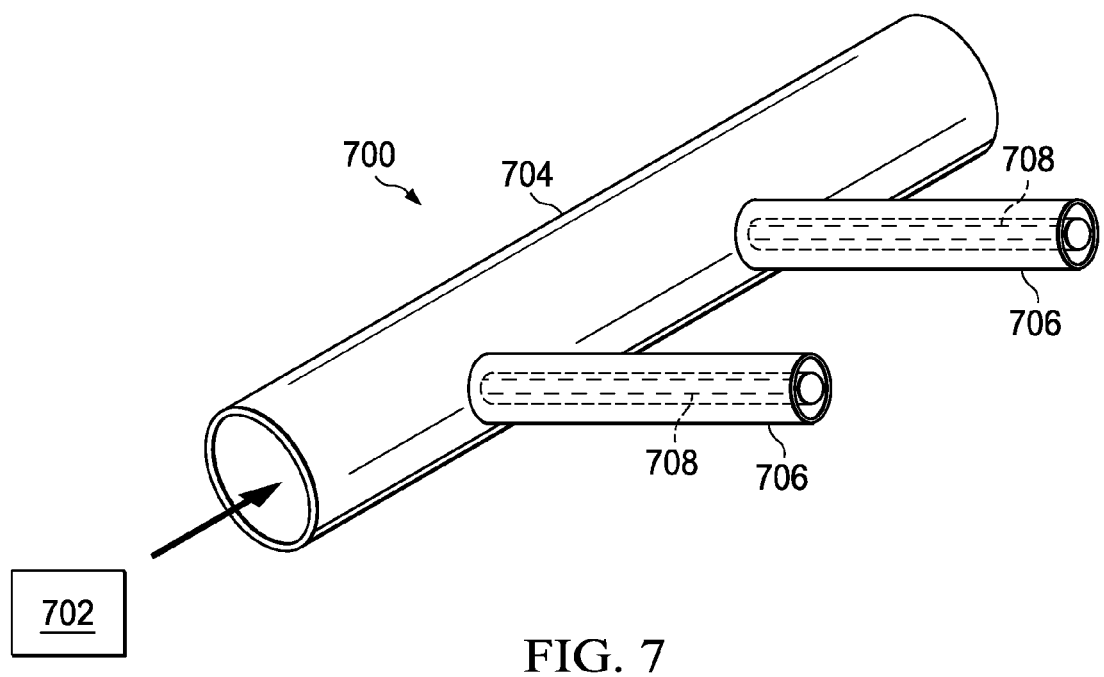
FIG. 7 is a diagram of a drip tape system depicted in accordance with an illustrative embodiment.

With reference now to FIG. 7, a diagram of a drip tape system is depicted in accordance with an illustrative embodiment. Drip tape system 700 may be implemented in drip tape environment 200 in FIG. 2. Drip tape system 700 includes water source 702, supply header 704, and drip tape 706.

Water source 702 may supply water or some other fluid to supply header 704. Water source 702 may be one example of one implementation of source 126 in FIG. 1. Water source 702 may supply water mixed with fertilizer. Supply header 704 distributes the fluid to drip tapes 706. Supply header 704 may be one example of one implementation of supply header 124 in FIG. 1. Drip tapes 706 may be one example of one implementation of drip tape 206 in FIG. 2. Drip tapes 706 include irrigation holes 708. Irrigation holes allow fluid to exit drip tapes 706.

Figure 8:
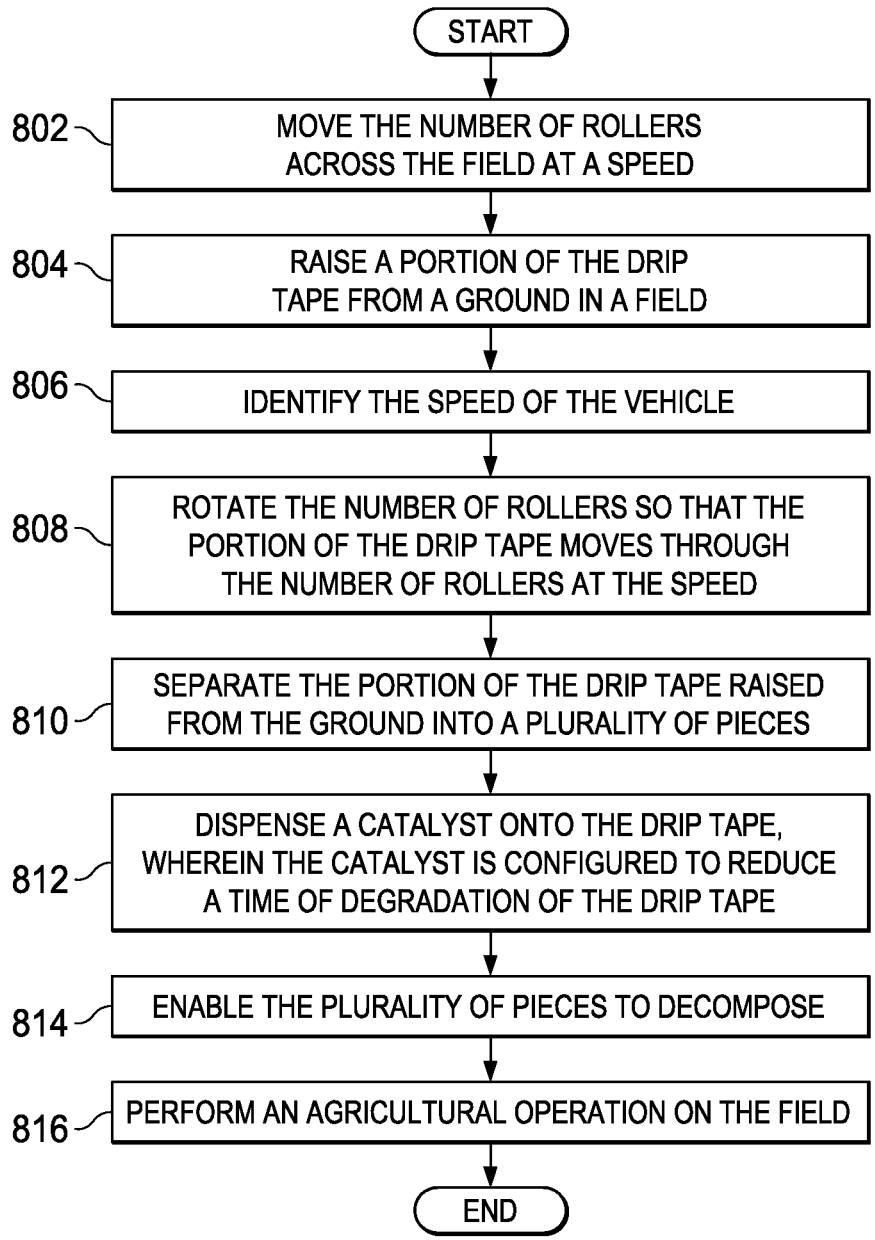
FIG. 8 is a flowchart illustrating a process for managing drip tape depicted in accordance with an illustrative embodiment.

With reference now to FIG. 8, a flowchart illustrating a process for managing drip tape is depicted in accordance with an illustrative embodiment. The process in FIG. 8 may be implemented by a component such as drip tape collection system 208 in FIG. 2, for example. Additionally, the process in FIG. 8 may be implemented in drip tape environment 200 in FIG. 2.

The process begins by moving a number of rollers across a field at a speed (step 802). The number of rollers may be located in a vehicle such as vehicle 202 in FIG. 2. The vehicle may be moving across the field at the speed, therefore, the number of rollers located in the vehicle will also be moving across the field at the speed.

The process raises a portion of the drip tape from a ground in the field (step 804). The drip tape may be raised by a guide, such as guide 218 in FIG. 2. In different illustrative embodiments, the drip tape may be attached to the number of rollers by a user and the number of rollers guide the drip tape themselves.

The process identifies the speed of the vehicle (step 806). The speed of the vehicle may be identified by a global positioning system and/or a speedometer. A controller rotates the number of rollers so that the portion of the drip tape moves through the number of rollers at the speed (step 808). The controller controls the number of rollers so that the drip tape is collected at the same, or near the same, speed as the vehicle is moving.

A chopper separates the portion of the drip tape raised from the ground into a plurality of pieces (step 810). The chopper may separate the drip tape by compressing the drip tape or by cutting the drip tape. A dispenser dispenses catalyst onto the drip tape (step 812). The catalyst is configured to reduce a time of degradation of the drip tape. The dispenser may dispense the catalyst after the drip tape has been separated. In different illustrative embodiments, the catalyst may be applied before the drip tape raised, before the drip tape is chopped after the drip tape has been raised, or after the drip tape has been returned to the ground. The chopper enables the plurality of pieces to decompose (step 814). In an illustrative embodiment, step 814 may comprise returning the plurality of pieces to the ground. In different illustrative embodiments, step 814 may also comprise transporting the plurality of pieces to another location. The drip tape may be returned to the ground by dropping the drip tape to the ground. In different illustrative embodiments, the drip tape may be scattered onto the ground, mixed into the ground, thrown onto the ground, or any combination thereof. In different illustrative embodiments, the drip tape may be transferred to another location. The other location may be inside the field or outside.

The vehicle performs an agricultural operation on the field (step 816). The agricultural operation may also be mixing the plurality of pieces into the ground. Thereafter, the process terminates.

The flowcharts and block diagrams in the different depicted embodiments illustrate the architecture, functionality, and operation of some possible implementations of apparatus, methods and computer program products. In this regard, each block in the flowchart or block diagrams may represent a module, segment, or portion of computer usable or readable program code, which comprises one or more executable instructions for implementing the specified function or functions. In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved.

For example, step 812 may not be included in the process of FIG. 8. In different illustrative embodiments, step 812 may be performed after the process of FIG. 8. Also, step 816 may not be performed as part of process 800.

The illustrative embodiments of the present invention provide a method and apparatus for managing drip tape. A vehicle is configured to move across a field. A drip tape collection system is associated with the vehicle configured to raise a portion of the drip tape from the ground in a field. A chopper is configured to separate the portion of the drip tape received from the drip tape collection system into a plurality of pieces and enable the plurality of pieces to decompose.

The different illustrative embodiments provide drip tape that can be used for irrigation over a period of time and then degraded upon finishing irrigation so as to not require removal from the field or interfere with subsequent field operations. The drip tape would also not be taken to a landfill and disposed.

The description of the different illustrative embodiments has been presented for purposes of illustration and description, and is not intended to be exhaustive or limited to the embodiments in the form disclosed. Many modifications and variations will be apparent to those of ordinary skill in the art. Further, different embodiments may provide different advantages as compared to other embodiments. The embodiment or embodiments selected are chosen and described in order to best explain the principles of the invention, the practical application, and to enable others of ordinary skill in the art to understand the invention for various embodiments with various modifications as are suited to the particular use contemplated.

What is claimed is:

1. An apparatus comprising:
a vehicle configured to move across a field;
a drip tape collection system associated with the vehicle configured to raise a portion of drip tape from a ground in a field;
a chopper configured to separate the portion of the drip tape received from the drip tape collection system into a plurality of pieces and return the plurality of pieces to the ground; and
a controller configured to control raising the portion of the drip tape from the ground and separating the portion of the drip tape.

2. The apparatus of claim 1, wherein the drip tape collection system comprises:
a number of rollers configured to raise the portion of the drip tape from the ground in the field.

3. The apparatus of claim 2, wherein the drip tape collection system comprises:
a guide configured to receive the portion of the drip tape from the ground and guide the portion of the drip tape onto the number of rollers.

4. The apparatus of claim 1, wherein the drip tape is a biodegradable material.

5. The apparatus of claim 4, wherein the chopper is selecting from a group consisting of a knife, saw, laser, and water jet.

6. The apparatus of claim 1 further comprising:
a speedometer configured to identify a speed of the vehicle, wherein the controller is configured to control rotating the number of rollers so that the portion of the drip tape moves through the number of rollers at the speed.

7. An apparatus comprising:
a vehicle configured to move across a field;
a drip tape collection system associated with the vehicle configured to raise a portion of drip tape from a ground in a field;
a chopper configured to separate the portion of the drip tape received from the drip tape collection system into a plurality of pieces and return the plurality of pieces to the ground, wherein the drip tape is a biodegradable material; and
a dispenser configured to dispense catalyst onto the drip tape, wherein the catalyst is configured to reduce a time of degradation of the drip tape.

8. An apparatus comprising:
a vehicle configured to move across a field;
a drip tape collection system associated with the vehicle configured to raise a portion of drip tape from a ground in a field;
a chopper configured to separate the portion of the drip tape received from the drip tape collection system into a plurality of pieces and return the plurality of pieces to the ground, wherein the drip tape is a biodegradable material; and
a tilling device configured to mix the plurality of pieces into the ground of the field.

9. An apparatus comprising:
a drip tape collection system configured to raise a portion of drip tape from a ground in a field;
a chopper configured to separate the portion of the drip tape received from the drip tape collection system into a plurality of pieces and return the plurality of pieces to the ground; and
a controller configured to control raising the portion of the drip tape from the ground and separating the portion of the drip tape.

10. The apparatus of claim 9, wherein the drip tape collection system comprises:
a number of rollers configured to raise the portion of the drip tape from the ground in the field.

11. The apparatus of claim 10, wherein the drip tape collection system comprises:
a guide configured to receive the portion of the drip tape from the ground and guide the portion of the drip tape onto the number of rollers.

12. The apparatus of claim 9, wherein the drip tape is a biodegradable material.

13. The apparatus of claim 12, wherein the chopper is selecting from a group consisting of a knife, saw, laser, and water jet.

14. The apparatus of claim 9 further comprising:
a vehicle;
a speedometer configured to identify a speed of the vehicle, wherein the controller is configured to control rotating the number of rollers so that the portion of the drip tape moves through the number of rollers at the speed.

15. An apparatus comprising:
a drip tape collection system configured to raise a portion of drip tape from a ground in a field;
a chopper configured to separate the portion of the drip tape received from the drip tape collection system into a plurality of pieces and return the plurality of pieces to the ground, wherein the drip tape is a biodegradable material; and
a dispenser configured to dispense catalyst onto the drip tape, wherein the catalyst is configured to reduce a time of degradation of the drip tape.

16. An apparatus comprising:
a drip tape collection system configured to raise a portion of drip tape from a ground in a field;
a chopper configured to separate the portion of the drip tape received from the drip tape collection system into a plurality of pieces and return the plurality of pieces to the ground, wherein the drip tape is a biodegradable material; and
a tilling device configured to mix the plurality of pieces into the ground of the field.

* * * * *